Patented Dec. 27, 1938

2,141,177

UNITED STATES PATENT OFFICE 2,141,177

SULPHUROUS DYESTUFFS AND PROCESS OF MAKING SAME

Ernst Dür, Basel, Switzerland, assignor to Society of Chemical Industry in Basle, Basel, Switzerland No Drawing. Application August 10, 1934, Serial No. 739,357. In Switzerland August 23, 1933

1 Claim. (Cl. 260—243)

The present invention relates to new sulphurous dyestuffs which are particularly suitable for dyeing vegetable fibers.

It has been found that compounds of the general formula

wherein $R_1$ represents a radical of an aromatic hydrocarbon consisting of at least 3 condensed carbocyclic nuclei, such as anthracene, phenanthrene, acenaphthene, chrysene, pyrene, pycene and the like, and $R_2$ represents an aromatic radical of the benzene or naphthalene series which is advantageously substituted in 4-position to the $R_1$-NH-group by OH-group, an amino-group or a substituted amino-group, are converted into new valuable sulphurous dyestuffs by treating these compounds at higher temperatures with agents yielding sulphur. These new dyestuffs, which are probably characterized by containing the thiazine grouping

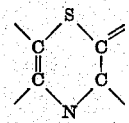

wherein the nitrogen atom is linked to one of the two pairs of carbon atoms by a double bond, and wherein one of these pairs of carbon atoms belongs to the radical $R_1$ defined above and the other to the radical $R_2$ defined above, dye vegetable fibers from alkaline baths containing reducing agents (e. g. sodium sulphide or sodium hydrosulphide) black-olive to green to blue tints which are distinguished by good fastness properties. They represent dark powders which are insoluble in water. As agents yielding sulphur there come into consideration the usual sulphurizing agents, such as sulphur itself, if desired with addition of catalysts, such as iodine, or of auxiliaries such as benzidine or toluylenediamine, further sulphur chloride, and finally the salts of hydrosulphuric acid, such as sodium sulphide or sodium polysulphides. Such sulphurizing agents and the processes according to which they are most advantageously applied are described in numerous pertinent publications. The treatment with agents yielding sulphur can be carried out, for example, at ordinary or increased pressure. The operation can also be conducted with or without aid of liquid solvents or diluents. If there are used solvents they may be aqueous or non-aqueous. Among the compounds of the above mentioned formula

particularly those come into consideration which contain in the aryl nucleus of the benzene or naphthalene series an OH- or an $NH_2$-group in para position to the $R_1$-NH-group. Such compounds are for example 2-(4'-hydroxyphenyl)-amino-anthracene, 1-(4-aminophenyl)-amino-hydroxyanthracene, further the corresponding compounds of the phenanthrene-, pycene-, chrysene-, pyrene-series etc., and the corresponding naphthalene derivatives.

The following examples illustrate the invention without, however, limiting the same, the parts being by weight:—

Example 1

5 parts of 2-(4'-hydroxyphenyl)-aminoanthracene are heated for 4 hours at 150–160° C. in a sulphurization mixture consisting of 5 parts of sodium tetrasulphide, 40 parts of cyclohexanol, and 2.4 parts of sulphur. The cyclohexanol is thereupon driven off and the dyestuff isolated from the sodium sulphide solution thus obtained. It dyes cotton blackish-olive tints.

The 2-(4'-hydroxyphenyl)-aminoanthracene can be produced as follows:—

10 parts of β-hydroxyanthracene, 20 parts of water and 100 parts of sodium bisulphide solution of 42 per cent. strength are boiled in a reflux apparatus for about 2 hours. After addition of 7 parts of p-aminophenol boiling is continued for 48 hours. The desired product crystallizes from the cold solution in light colored crystals.

Example 2

7 parts of quinone-chlorimide are dissolved in 150 parts of sulphuric acid of 96 per cent. strength and added as quickly as possible to a solution consisting of 10 parts of α-hydroxyanthracene and 150 parts of sulphuric acid of 96 per cent. strength at −20° C. The indophenol thus formed is poured into a mixture of ice and aqueous ammonia, filtered off by suction and converted into the leuco compound with sodium sulphide.

4 parts of the leuco compound thus obtained are heated for 4 hours at 150–160° C. in a sulphurization mixture consisting of 5 parts of sodium tetrasulphide, 40 parts of cyclohexanol and 2.4 parts of sulphur. The cyclohexanol is thereupon removed with steam and the dyestuff separated in known manner, for example by mixing the sodium sulphide solution freed from cyclohexanol with ammonium chloride. There is obtained a dark green sulphur dyestuff.

Example 3

7.5 parts of quinone-chlorimide are dissolved in 150 parts of sulphuric acid of 96 per cent. strength and mixed as quickly as possible with a solution consisting of 14 parts of the carbazole derivative, derived from 1-phenylaminoanthracene, and 200 parts of sulphuric acid of 96 per cent. strength at −15° C., poured on to ice, neutralized with ammonia, filtered off by suction, and converted into the leuco compound with sodium sulphide.

5 parts of the N-aryl derivative of the anthracene series thus obtained are heated for 4 hours at 150–160° C. in a suphurization mixture consisting of 5 parts of sodium tetrasulphide, 40 parts of cyclohexanol and 2.4 parts of sulphur. After removing the cyclohexanol the separated dyestuff is filtered. It dyes cotton from the hydrosulphite bath blue-green tints.

Example 4

1 part of 3-(4'-hydroxyphenyl)-aminophenanthrene (obtained from 3-hydroxyphenanthrene and para-aminophenol, cf. paragraph 3 in Example 1) is introduced into a mixture consisting of 9 parts of crystallized sodium sulphide and 3.5 parts of sulphur. After further addition of 4 parts of sulphur and 2 parts of common salt the whole is dried in a vacuum, and the mass obtained pulverized and baked for 3 hours at 230–235° C. The baked material is finely ground and introduced into water of about 75° C. The mixture is thoroughly stirred for some time, neutralized with sulphuric acid and filtered. The sulphur dyestuff thus obtained dyes cotton from a bath containing sodium sulphide grey-green tints.

A dyestuff dyeing green tints is obtained by sulphurizing in the same manner the indophenol obtained from hydroxychrysene and quinone-chlorimide. The hydroxychrysene itself is obtained from chrysene by nitrating, reducing and hydrolyzing the aminochrysene with dilute hot acid.

Example 5

Cotton is dyed in the manner usual for sulphur dyestuffs with 5–6 per cent. of the product of Example 1, 25 per cent. of sodium sulphide, 5 parts of sodium carbonate and 25 parts of sodium sulphate per liter of liquor, the proportion of liquor to the goods being 1:20. The dyestuff is first of all heated to boiling with the sodium sulphide in form of a solution of 10 per cent. strength and the sodium carbonate in form of a solution of 10 per cent. strength, until dissolution has occurred. The dyestuff solution is then added to the dyeing liquor heated to 60° C., the material entered, and the bath further heated to near boiling temperature. The sodium sulphate is now entered and dyeing continued for a further hour. The yarn is withdrawn, wound off, and exposed to the air for oxidation. Finally, the goods are thoroughly rinsed and dried.

Example 6

5 parts of the dyestuff obtained according to the data of Example 3 are vatted at 50–60° C. with addition of 15 parts by volume of caustic soda solution of 33 per cent. strength, 200 parts of water and 15 parts of sodium hydrosulphite. The whole is then diluted with 200 parts of water, 21 parts of cotton are introduced and dyed first of all for half an hour at 50–60° C., then for 15 minutes at 70° C. The material is wound off, oxidized in the air for 30 minutes, well rinsed and dried. The cotton is dyed deep green-blue tints of good fastness properties.

What I claim is:—

The sulphurous dyestuffs containing the thiazine grouping

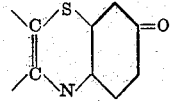

wherein the pair of carbon atoms

belongs to an anthracene nucleus, which products represent dark powders insoluble in water, and dyeing cotton from alkaline baths containing reducing agents black to olive to green and blue tints.

ERNST DÜR.